(No Model.)
S. P. TALLMAN.
STOCK CAR.
No. 250,461.  Patented Dec. 6, 1881.
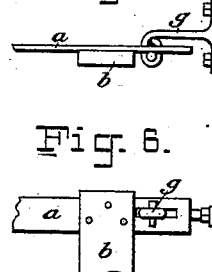
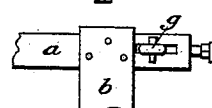
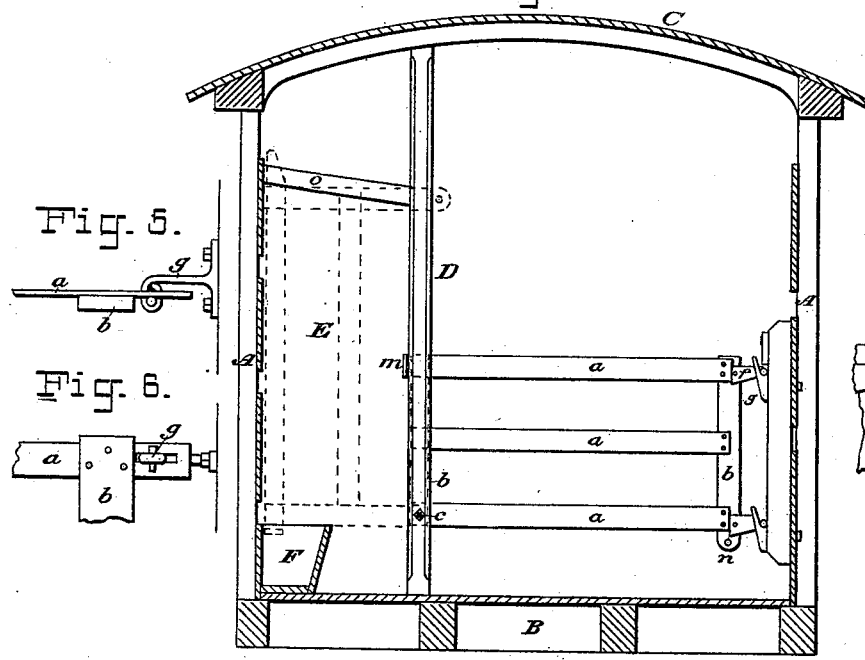
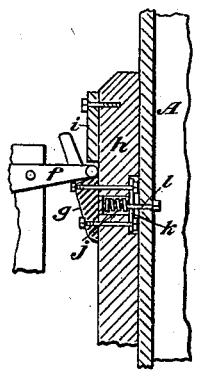
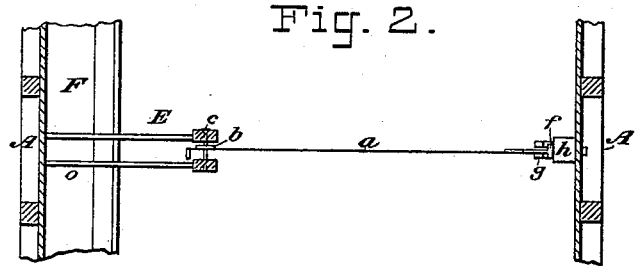
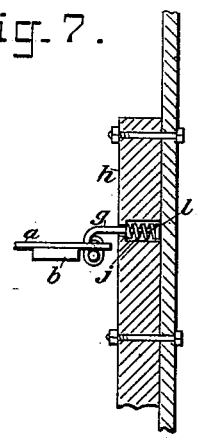
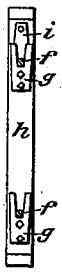
WITNESSES:
E. B. Bolton
Geo. Baunton
INVENTOR:
Stephen P. Tallman,
By his Attorneys,
Burke, Fraser & Connett.

UNITED STATES PATENT OFFICE.

STEPHEN P. TALLMAN, OF DUNELLEN, NEW JERSEY.

STOCK-CAR.

SPECIFICATION forming part of Letters Patent No. 250,461, dated December 6, 1881.

Application filed September 19, 1881. (No model.)

*To all whom it may concern:*

Be it known that I, STEPHEN P. TALLMAN, a citizen of the United States, residing at Dunellen, in the county of Middlesex and State of New Jersey, have invented certain Improvements in Stock-Cars, of which the following is a specification.

My invention relates to that class of stock-cars in which the animals are separated by means of removable and flexible partitions, the object being to provide a partition or gate that will yield to pressure, will not injure the cattle, and at the same time will be simple and easily removed for the loading of the cattle, and readily set in position when the animals are placed.

In the drawings, Figure 1 is a transverse section of a stock-car showing my gate or partition in its most approved form. Fig. 2 is a plan of the same. Fig. 3 is a detached view, showing the fastening of the gate in front elevation. Fig. 4 is an enlarged sectional view, detached, showing the preferred form of fastening for the gate. Figs. 5, 6, and 7 are detached views, showing modifications of the gate-fastening.

My invention comprehends a gate which will yield elastically to pressure from the animals. It may be constructed of elastic materials, as thin steel strips, so that when properly hung it will yield to pressure; or it may be made from less elastic materials and be provided with elastic fastenings; or it may embody both of these constructions, and I prefer that it shall. Figs. 1, 2, 3, and 4 represent a gate of this kind.

Let A A represent the sides, B the bottom, and C the roof of a car.

D represents a post formed of two strips of wood extending from floor to roof of the car, with a narrow space between them. From this post to the side of the car extends a fixed partition, E, which forms a shallow stall to separate the heads of the cattle. F is the watering and feeding trough, which may extend the entire length of the car.

To separate the bodies of the animals I provide a gate made from thin, flexible, and elastic strips or slats $a$ $a$ of steel, secured at their ends to strips or plates $b$ $b$, of iron or some stiffer material than the slats. One end of this gate is hinged or pivoted at the lower corner, $c$, between the members of the post D, and the gate is arranged to turn up and back, so as to stand on end on or over the trough F beside the fixed partition E, so as to be out of the way and leave a free passage for the animals when they are being loaded. The gate is fastened when down and in place by means of two T-headed projections, $f$, (see Figs. 2 and 4,) which engage beveled and forked catches $g$ $g$ secured to a bar or strip, $h$, attached elastically to the side of the car. These two fastenings on the gate are constructed alike, and the same description will serve for both. The neck of the T-head $f$ enters between the branches of the catch $g$, and as its lateral projections engage the beveled faces of said branches the gate is strained. The upper fastening has a gravity button or stop, $i$, which swings over the T-head and prevents it from lifting. The strip $h$ is provided with a socket containing a spring, $j$, and this socket, after the spring is inserted, is covered by a plate, $k$, which has in it an aperture through which plays a bolt or rod, $l$. This rod is secured to the car and passes through the spring, and a head on its inner end rests on the end of the spring. This arrangement is such that an attempt to draw the strip $h$ away from the side of the car will be elastically resisted by the spring. I have described but one elastic attachment, but two or more will usually be required, and other kinds may be employed. The gate is provided with a stop, $m$, so that its upper corner cannot be drawn out from between the members of the post D, and a projection, $n$, at its outer lower corner, which projects out into view when the gate is turned back to enable the operator to draw it down. A bar, O, may also be extended from the side of the car to the post D, to better secure the gate when turned back.

In Figs. 5 and 6 I have shown a fastening of simple form adapted to a gate made from elastic material and where it is not desired to employ an elastic fastening. In this case the end of the upper slat is prolonged and slotted to form a hasp to engage a provision, $g$, attached rigidly to the side of the car. The provision $g$ has a hooked extremity with an eye in it, and when this extremity is passed through the slot in the slat a retaining-pin is inserted in the eye to prevent disengagement of the parts. The slot permits the gate to yield to pressure, and its own resiliency brings it back to its normal position. In Fig. 7 the same construction is shown except that the provision $g$ is attached elastically to the car and its extremity fits more closely in the slot, no play in this case being needed.

Other materials may be used with steel, or to replace steel, in the construction of the gate—as, for example, iron, wood, vulcanized fiber, rubber, &c. A bolt or latch may also be employed to hold the gate up, or it may be provided with a counter-weight to balance it. In some cases, also, an elastic gate of this character may be made to swing around on hinges, or be raised vertically. I prefer, however, the described arrangement.

I am aware that flexible partitions in the nature of sheets of canvas and leather or rubber belts have been employed or suggested for this purpose, but these when freed at one end drop limp upon the floor of the car; and I am also aware that gates have been proposed, made from elastic material, and arranged to be hoisted up vertically for the animals to pass under. These I make no claim to, and they demand either a very low gate or a very high car, as they must be raised over the heads of the animals. My gate, as will be seen by the drawings, is preferably made just as high as the shallow stall is deep, and when turned up into said stall it occupies no appreciable space and is entirely out of the way.

Partitions made from two crossed slats of an X form and arranged to close up on the principle of a lazy-tongs have also been proposed; but these are not well suited for partitions, and do not retain their form so as to be quickly and easily handled. My purpose is to provide a gate that will retain its form when freed at one or both ends and not fall into the litter on the car-floor, and which will at the same time possess all the advantages of a flexible, elastic, and yielding partition.

Having thus described my invention, I claim—

1. A stock-car provided with elastic yielding gates to form, when down, partitions between the animals, and arranged to be turned up edgewise on their hinging-points into shallow stalls adapted to house the heads of the animals in the car, said gates being rigidly constructed so as to retain their forms at all times, as set forth.

2. The combination, with a car having shallow stalls to house the heads of the animals, of the elastic and yielding partition-gates hinged at their lower corners to posts at the entrances of said stalls, and arranged to turn up on end when not in use alongside of the partitions between said stalls, said gates being provided with suitable fastenings by which their free ends when in use are secured to the side of the car, substantially as set forth.

3. The combination, with a car having shallow stalls to house the heads of the animals, and posts at the entrances of said stalls, of the partition-gates hinged to said posts and arranged to turn up into said stalls, and elastic fastenings fixed to the opposite side of the car to secure the free ends of the gates when in use, substantially as set forth.

4. The combination, with the car having posts D and partitions E, arranged to form shallow stalls, of the elastic gate hinged at $c$ in said posts, and provided with T-heads $f$, and the strip $h$, attached elastically to the side of the car and provided with the forked and beveled catches $g$, and gravity-drop $i$, all arranged substantially as and for the purposes set forth.

5. The combination of the car provided with membered posts D, of the elastic gates hung between the two members of said posts and provided with stops $m$ and projections $n$, substantially as and for the purposes set forth.

In witness whereof I have hereunto signed my name in the presence of two subscribing witnesses.

STEPHEN P. TALLMAN.

Witnesses:
 WILLIAM D. LANDRAY,
 HENRY CONNETT.